Oct. 4, 1966  D. W. BOSTWICK  3,277,484
AIRCRAFT FLIGHT INSTRUMENT SYSTEM
Filed June 13, 1963  4 Sheets-Sheet 1
FIG. I
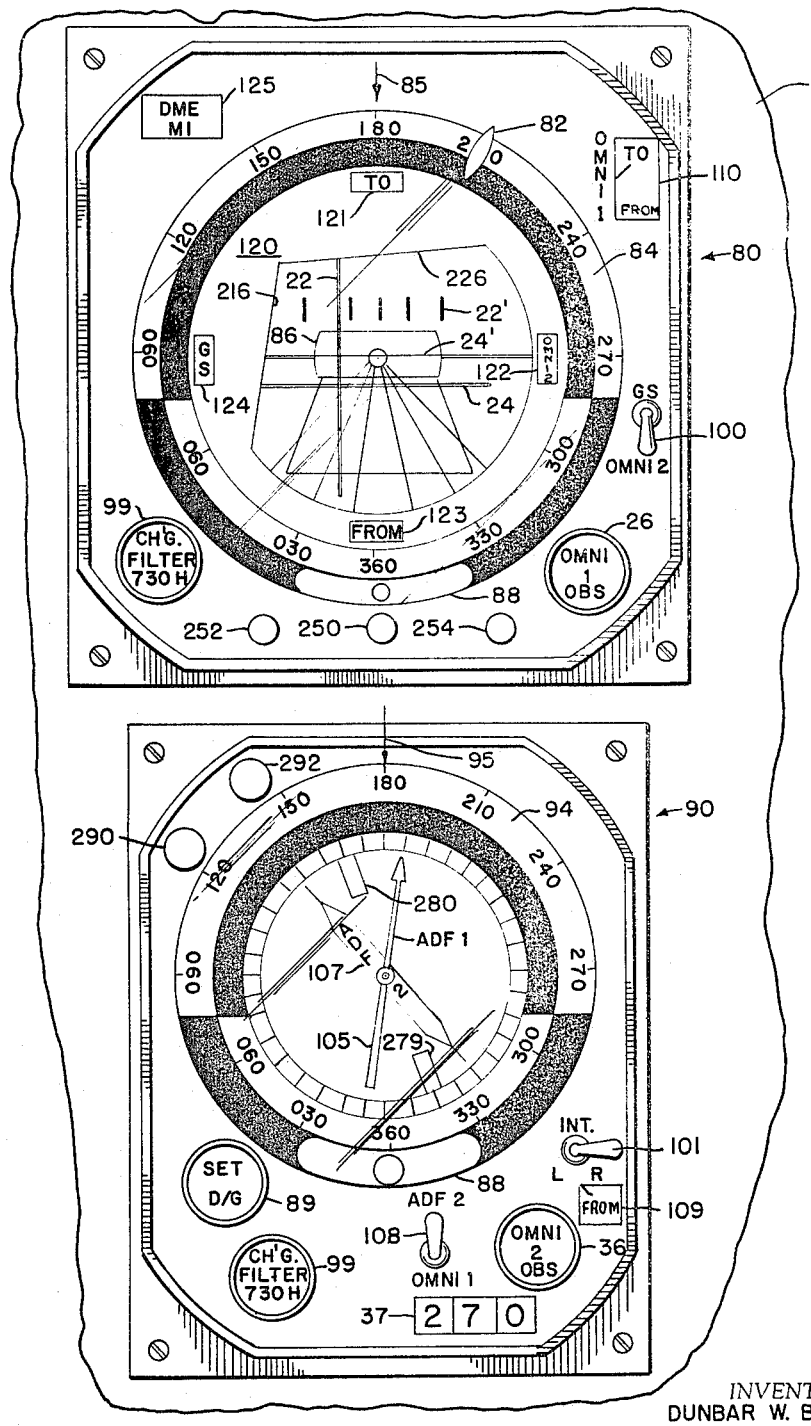
INVENTOR.
DUNBAR W. BOSTWICK
BY Darby & Darby
ATTORNEYS

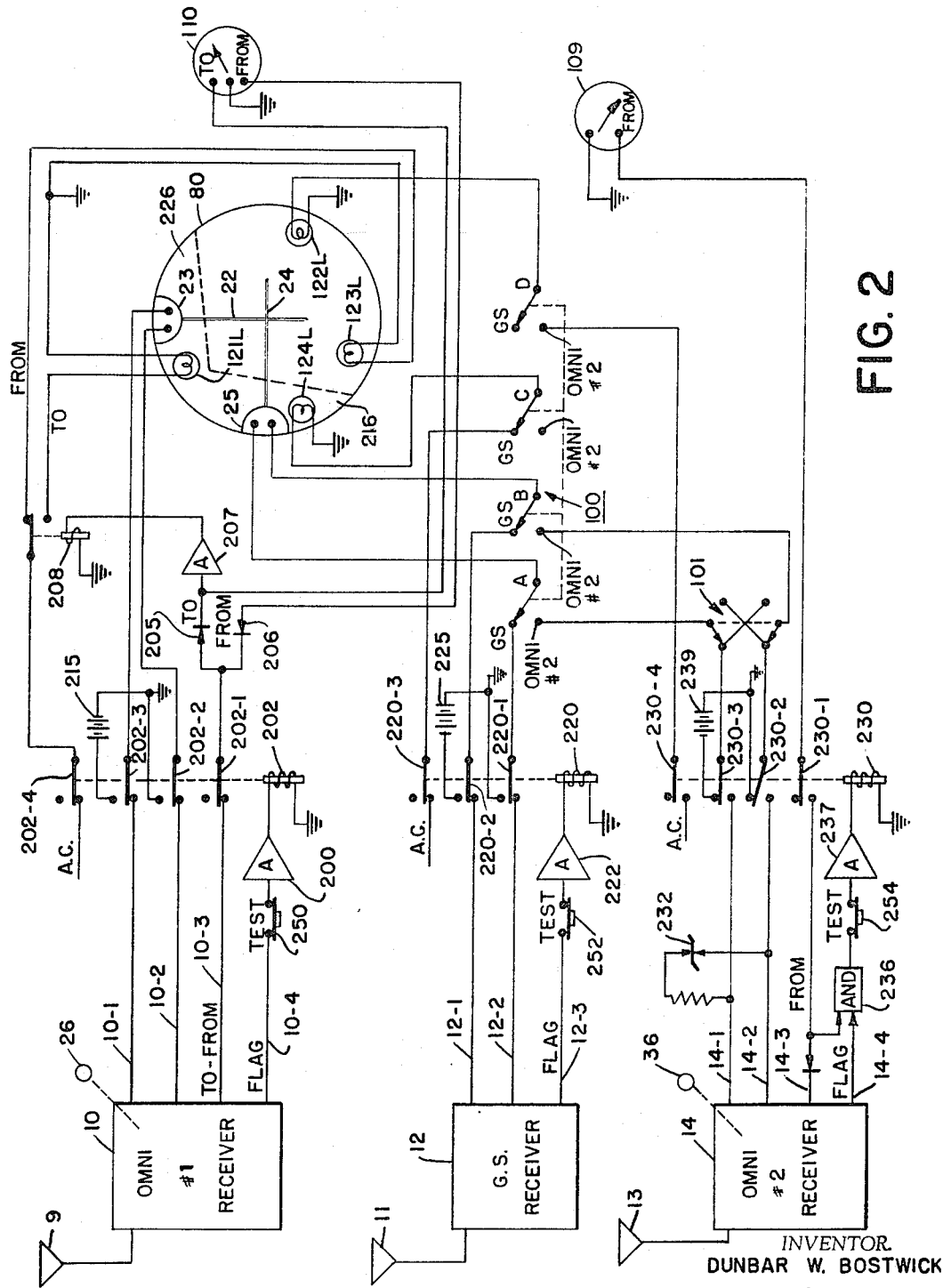

Oct. 4, 1966 D. W. BOSTWICK 3,277,484
AIRCRAFT FLIGHT INSTRUMENT SYSTEM
Filed June 13, 1963 4 Sheets-Sheet 3
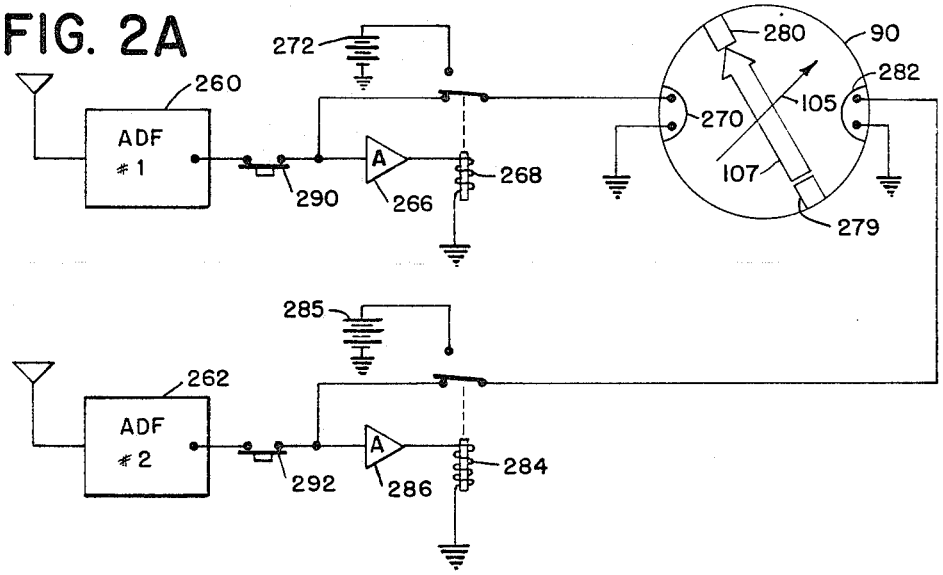
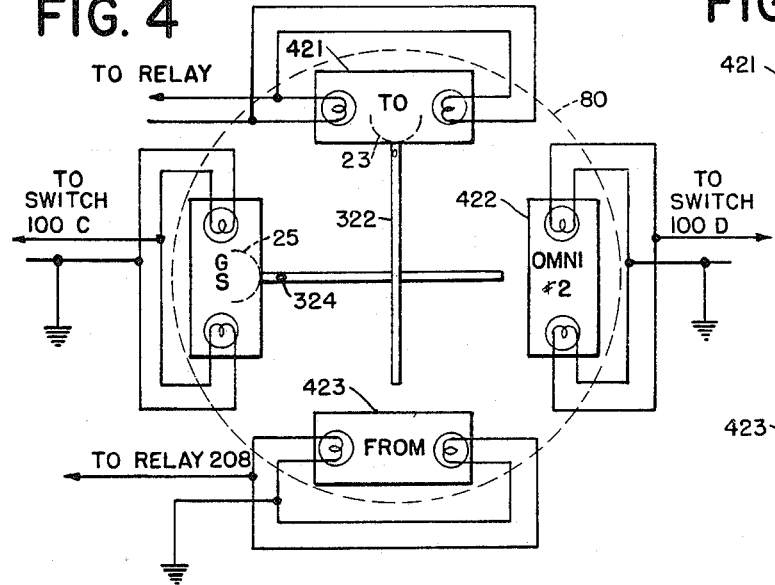
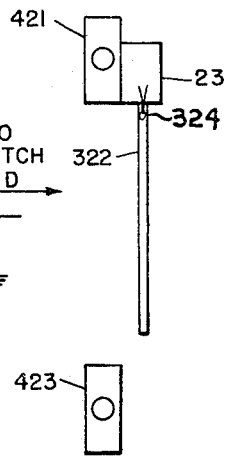
INVENTOR.
DUNBAR W. BOSTWICK
BY Darby & Darby
ATTORNEYS Oct. 4, 1966   D. W. BOSTWICK   3,277,484
AIRCRAFT FLIGHT INSTRUMENT SYSTEM
Filed June 13, 1963   4 Sheets-Sheet 4

INVENTOR.
DUNBAR W. BOSTWICK
BY Darby & Darby
ATTORNEYS

United States Patent Office 3,277,484
Patented Oct. 4, 1966

3,277,484
AIRCRAFT FLIGHT INSTRUMENT SYSTEM
Dunbar W. Bostwick, Shelburne, Vt., assignor to Aviation Instrument Manufacturing Corp., Houston, Tex., a corporation of Texas
Filed June 13, 1963, Ser. No. 287,702
10 Claims. (Cl. 343—107)

This invention relates to aircraft flight instrument systems and more particularly to an instrument system for use in an aircraft radio navigation equipment to present a clear and fail-safe display.

Many aircraft are presently equipped with omnirange and glide slope receivers to enable them to navigate by making use of the signals transmitted by omnirange (V.O.R.) and instrument landing system (I.L.S.) stations located on the ground. Operational use of this type of equipment on aircraft has become prevalent throughout this country in the past few years.

A typical aircraft omnirange and instrument landing system installation includes some type of an indicator to display the information received from the various ground stations. This display is desirably presented in a manner which readily enables the pilot to steer his aircraft in accordance with the ground signals. In a typical aircraft indicator, two pointers are provided which are moved in response to the radio signals received from the ground stations. The first of these pointers, which is usually mounted vertically, is moved by signals received from an omnirange station selected by the pilot. Each omnirange ground station transmits a number of course radials which correspond to magnetic headings on a compass. The vertical pointer of the indicator is moved to the left or right to show the pilot in which direction he is to steer the aircraft to fly a course established by a selected course radial from the omnirange station.

The second indicator pointer, which is usually mounted horizontally, is moved by signals from the aircraft's glide slope receiver. This pointer is normally only moved during an instrument approach to a runway so, in effect, it is in use only for a relatively short period of time during the overall flight of the aircraft.

The aircraft indicator is usually also provided with several types of warning devices to enable the pilot to ascertain certain information and also to indicate whether or not certain parts of the aircraft's radio navigation system are operating properly. One of these devices, which operates in conjunction with the aircraft's omnirange receiver, is called a TO–FROM indicator. This TO–FROM indicator, which may be for example a movable flag, tells the pilot whether the aircraft is approaching the selected omnirange ground station on the selected course radial or whether the aircraft has passed the station. If the aircraft is approaching the station then the TO part of the indicator is energized while if the aircraft has already passed the station and is still proceeding on the same course radial the FROM portion of the indicator is energized. It is necessary for the pilot to have the TO–FROM information in order for him to accurately ascertain his position with respect to the omnirange station.

A second type of indicating device utilized is the so-called warning flags which are associated with both the omnirange and the glide slope receivers. The flags indicate whether the aircraft's omnirange and glide slope receivers are receiving signals from respective ground stations and whether these signals are of a magnitude large enough to properly actuate the various pointers of the pilot's indicating device.

Considerable effort has been expended to make the display on the pilot's indicator as simple as possible so that he might be able to obtain the necessary steering information at a quick glance, and also to provide him with some type of an indication that all or a portion of his radio navigation equipment is inoperative. It has been found that in many of the indicators currently in use the pilot is not sufficiently apprised of whether his omnirange receiver is working in the TO or FROM mode. More importantly, the pilot is not adequately made aware of whether or not his omnirange and/or glide slope receivers are actually working.

The present invention is directed to improved indicators for aircraft to present the omnirange and glide slope information to a pilot. More particularly, the present invention provides several novel arrangements wherein operation of the omnirange receiver in the TO or FROM mode is clearly indicated to the pilot. Also, provision is made to make the indicator fail-safe so that in the event there is a power failure on the aircraft or either the omnirange, or glide slope receivers become inoperative due to some other cause, the pilot is given a positive indication of a system malfunction.

In one embodiment of the invention the vertical pointer, which provides the omnirange information is arranged so that it is illuminated when omnirange signals are being received and the source of illumination of the pointer appears to be at the top or bottom of the indicator. This gives the pilot an illusion of the vertical pointer being moved from in front of (TO) or behind (FROM) the omni station and thereby provides a more positive indication that he is going TO or FROM the station. In another embodiment of the invention a number of illuminated positions are provided on the face of the indicator to indicate the TO or FROM mode of operation and these positions are illuminated accordingly.

Provision is also made in the invention to give a positive indication of the inoperative condition on either the omnirange or glide slope receivers. This is accomplished in a preferred embodiment of the invention by moving the pointers away from the viewing portion of the indicator when a malfunction has occurred. Malfunction could occur in either the receiver itself or in the power supply of the aircraft. When the pilot cannot see a respective pointer in the viewing portion of the indicator then he is made positively aware that the respective omnirange or glide slope system, or both, is inoperative. The present invention also provides a fail-safe arrangement for the automatic radio direction (ADF) finder system in the aircraft by giving the pilot an indication that the radio direction finder equipment is inoperative or not receiving signals. This is done by moving the direction finder pointers to a predetermined position so that a portion of each of the pointers is obscured from view.

The indicator system of the present invention is preferably used in conjunction with the intercept system disclosed in my prior copending application Serial No. 266,358, entitled "Aircraft Radio Navigation Instrument System," filed on March 19, 1963, now Patent 3,234,552, issued February 8, 1966, which is assigned to the same assignee, Aviation Instrument Manufacturing Corporation of Houston, Texas. In that system provision is made for taking the omnirange receiver signals from a second omnirange receiver and applying them to the indicator glide slope pointer during the periods when the pilot is trying to establish intercept points. This arrangement gives the pilot a clear presentation of the establishment of an intercept during a flight. Operation of the intercept system is clearly described in the aforesaid case and reference is made thereto for a more complete explanation.

It is therefore an object of the present invention to an improved indicator system for aircraft radio navigation systems.

A further object of the invention is to provide an improved indicator system for use with omnirange and glide slope receivers of an aircraft.

Still a further object of the invention is to provide an improved indicator system for use with omnirange and glide slope receivers of an aircraft.

It is another object of the invention to provide an improved indicator system in which an illuminated presentation is made to indicate the operational condition of the omnirange and glide slope receivers.

A further object of the invention is to provide an improved indicator display for obscuring a portion of the radio direction finder pointers when the radio direction finder system of the aircraft is either inoperative or no signals are being received.

Other objects and advantages of the present invention will become more apparent upon reference to the following specification and annexed drawings in which:

FIGURE 1 is a front plan view of an instrument presentation made according to the invention;

FIGURE 2 is a schematic diagram of one form of the invention using a vacuum type fail-safe arrangement;

FIGURE 2A is a schematic diagram of a fail-safe system for a radio direction finder;

FIGURE 4 is a view of another type of instrument presentation made according to the invention; and FIGURE 4A is a side view of a portion of the indicator of FIGURE 4.

Figure 3:
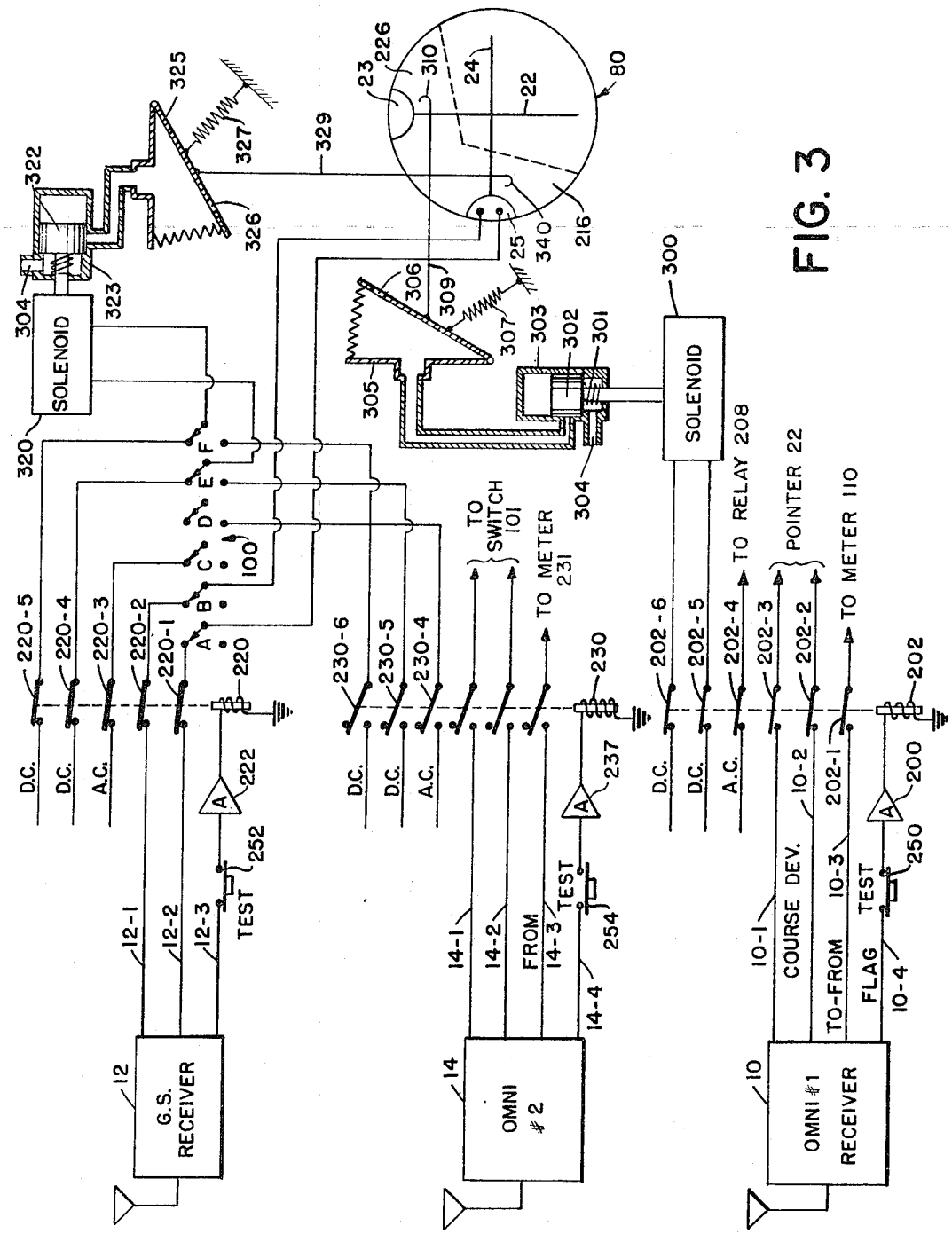
FIGURE 3 is a schematic diagram of another embodiment of the invention showing a fail-safe arrangement.

FIGURE 1 shows an aircraft installation having instruments which utilize the invention. Here, a complete flight instrument presentation is given, including the magnetic compass, automatic radio direction finders, artificial horizon and slip indicators. This presentation includes a first indicator 80, mounted on the control panel 81 of the aircraft, which houses the vertical course deviation pointer 22 and meter movement (not shown) and the horizontal glide slope pointer 24 and meter movement (not shown). The pointer 22 is supplied with signals from a first omnirange receiver and is moved to the left or right in accordance with the position of the aircraft with respect to a selected course radial transmitted by a first omnirange station on the ground to which the first receiver is turned. Similarly, the glide slope pointer 24 is moved up and down by signals from a glide slope receiver. In a preferred embodiment of the invention the glide slope pointer 24 may also be moved by signals from a second omnirange receiver in order to establish intercept points. This operation is described in the aforesaid copending application.

The indicator 80 also has a central null scale line 24' for the horizontal pointer 24 and a number of scale markings 22' angularly positioned across the face of the indicator for the vertical pointer 22. These scale markings are useful for indicating the exact location of the respective pointers and hence the position of the aircraft with respect to the received radio signals.

A course set knob (OBS) 26 is provided on the indicator 80 for the first omnirange receiver. The course set knob is used to select the desired course radial of an omnirange station by moving a "bug" 82 around a compass card 84. The course set knob 26 rotates suitable resolvers or synchros to establish a reference voltage to be compared with the signals received by the first omnirange receiver. This operation is conventional and the resultant of the comparison of these signals is used to deflect the course deviation pointer 22 to the left or right depending upon the position of the aircraft with respect to the selected course radial signal.

The compass card 84 is either slaved and driven by the aircraft's gyro stabilized magnetic compass, or other suitable type of compass (not shown), which indicates the magnetic heading of the aircraft under a fixed pointer 85. Alternatively, the compass card can be operated as a repeater indicator by the aircraft's directional gyro, or, it can be operated manually without the use of either an electrically connected gyro or compass.

An artificial horizon 86 is also shown which is controlled by the aircraft gyro in the conventional manner to indicate the altitude of the aircraft with respect to the horizon. A "window type" horizon display 86 is preferably used which presents the picture of the horizon that the pilot would see if he were looking out of his window. A conventional slip indicator 88 is also provided which may be of the electric or air driven type.

The indicator 80 also has a switch 100 which is used to selectively control the operation of the horizontal pointer 24 by either a glide slope (GS) receiver or a second omnirange receiver (OMNI 2). The operation of this system is fully described in the aforesaid patent application and, briefly, when the switch 100 is in the GS position the pointer 24 is moved up and down in the conventional manner on an instrument landing approach (ILS) to a runway by using the glide slope receiver to pick up the ILS signal. When switch 100 is in the OMNI 2 position, a course radial signal received by a second omnirange receiver, which is different from the first omnirange receiver driving the vertical course deviation pointer 22, is used to move the horizontal pointer 24. The second omnirange receiver is tuned to a station different from that tuned by the first omnirange receiver and a course radial is selected from the second station to establish an intercept with the course radial selected from the first omnirange station. The intercept point is indicated when the horizontal and vertical pointers 22 and 24 cross each other at the center of the face of the indicator 80. The course radial from the second omnirange station is selected by the OMNI 2 (OBS) course selector knob 36 on the second indicator 90.

The first indicator 80 also contains a TO–FROM meter 110 which is operated by the first omnirange receiver. This meter operates in a conventional manner so that its pointer is moved to the TO position when the aircraft is approaching the selected omnirange station along the selected radial. The pointer moves to the FROM position when the aircraft passes the omnirange station and is still flying along the course radial.

The second indicator 90 of the presentation has the course set knob 36 for the second omnirange receiver. Rather than use a "bug" a digital display used for the course radial selected from the second station and this digital display is presented in the window 37. An intersection left-right switch 101 (INT L–R) is also provided. This switch reverses the connections to the meter during the horizontal pointer so that the pointer always moves in the same direction when a course intercept is being approached. In a preferred form of the invention the second omnirange receiver is operated only in the FROM mode so a predetermined direction for the movement of pointer 24 can be provided.

Indicator 90 also has a compass card 94 and a stationary marker 95, if desired. The indicator also preferably houses a slip indicator 88 for the pilot's convenience as well as a directional gyro set knob 89 to set both compass cards 84 and 94 when a directional gyro is to control these elements. Of course, the compass card 82 in the first indicator 80 does not have to be slaved and, as explained before, the compass cards can be manually rotated. In fact, both cards 84 and 94 can be made stationary if the pilot is not to be provided with relative bearing and heading information to selected locations.

The second indicator 90 also has first and second automatic direction finder (ADF) pointers 105 and 107 which are driven by two conventional automatic direction finder receivers (not shown) for example of the ARN–6 or ARN–7 type. The second ADF pointer 107 may be connected by a switch 108 to point the direction to the selected course radial of the first omnirange station. This is a conventional operation and no further description thereof is given. A TO-FROM meter 109 which indicates the mode of operation of the second omnirange receiver is also provided. The TO portion of the meter 109 may be removed, if desired, when the second omnirange receiver is to operate only in the FROM mode to establish intercept points.

In order to enhance the presentation of the information to the pilot a portion of the first indicator 80, generally designated by the reference numeral 120, is made opaque. The opaque portion has partialy transparent sections 121, 122, 123 and 124 therearound with indicia printed underneath which will show through the opaque portion when a light is illuminated. The section 121 which is at the top of the indicator contains the indicia designation TO and this section is lighted when the aircraft's first omnirange receiver is operating in the TO mode. Thus, the pilot is given visual information, in addition to the TO-FROM meter 110, right above the top of pointer 22. Similarly, the section 123 at the bottom of the indicator has the indicia FROM which is illuminated only when the first omnirange receiver is in the FROM mode of operation. Therefore, by merely looking at the opaque ring 120 the pilot will readily be presented with an indication of what mode of operation the first omnirange receiver is in. It should be apparent that since the TO marking is at the top of the ring adjacent the top of the course deviation pointer 22 and the FROM marking is at the bottom of the opaque ring adjacent the bottom of the pointer, that the pilot will be given the illusion that the course deviation pointer 22 is being moved from either the top or the bottom of the indicator in accordance with which mode the receiver is operating. This display helps the pilot to interpret the information that he is receiving.

Similarly, the section 122 on the right side of the ring contains the marking OMNI 2 while the lefthand section 124 contains the marking GS. These sections are respectively illuminated depending upon the position of the switch 100 on the first indicator. Thus, the pilot will be made readily aware of the operating condition of the various systems.

FIGURE 2 shows an embodiment for fail-safe operation which removes the horizontal and vertical pointers from their viewing positions upon a power failure of the aircraft or upon failure of an omnirange or glide slope receiver systems. The first omnirange receiver 10 for controlling the movement of the vertical course deviation pointer 22 is tuned by a control (not shown) to receive signals on an antenna 9 from a selected station. The course set knob 26 selects the course radial, and signals are produced by the receiver on lines 10-1 and 10-2 for application to a meter 23 which moves the pointer 22. The receiver 10 also produces TO-FROM signals on line 10-3 to indicate whether the aircraft is approaching or has passed the selected station. A flag warning signal is produced on line 10-4 when the receiver 10 is operating properly and is receiving signals of sufficient magnitude to operate the pointer 22. All of these signals are produced in a conventional manner by a conventional omnirange receiver, the latter forming no part of the present invention in itself.

The course deviation signals from receiver 10 are applied through contacts 202-2 and 202-3 of a relay 202. The relay 202 is shown in the energized condition, having been energized by a flag warning signal on line 10-4 amplified by relay amplifier 200. The TO-FROM signal on line 10-3 is applied through relay contact 202-1 to a TO steering diode 205 and a FROM steering diode 206. The TO-FROM signals are of respectively different polarities so they may be segregated by the oppositely poled diodes 205 and 206. The outputs of the two diodes are used to operate the pointer of the TO-FROM meter 110, as shown.

When a flag warning signal is present, relay 202 is energized and also closes relay contact 202-4. This applies an A.C. voltage to the center arm of a relay 208. Relay 208 is energized by the TO signal which is amplified in relay amplifier 207. In the de-energized condition shown, the A.C. voltage is applied through the upper contact of relay 208 to the lamp 123L and lights this lamp behind position 123 on the indicator 80 to show that the receiver 10 is operating in the FROM mode. When a TO signal is present on line 10-3 it is amplified in amplifier 207, and relay 208 is energized thereby applying the A.C. voltage through the lower contact of the relay to lamp 121L to light the TO indicia on position 121 of the indicator 80. The pilot is made aware of whether the first omnirange receiver 10 is operating in the TO or FROM mode by the operation of the two lights 121L and 123L.

If receiver 10 is not operating or if there has been a power failure in the aircraft system, then there will be no flag warning signal on line 10-4 and relay 202 will be de-energized. When this occurs, relay contact 202-4 is opened thereby removing the voltage from both lamps 121L and 123L. Similarly, contact 202-1 opens removing the signals from the TO-FROM meter 110. When relay contacts 202-2 and 202-3 open they apply a voltage from a battery 215 across the terminals of the course deviation meter 23. This voltage is of a polarity to move the course deviation pointer to the left under the opaque portion 216 of the indicator which is an extension of the opaque ring 120 (FIG. 1). In this manner the pilot is positively aware that the first omnirange receiver system is not operating properly and he will not be misled by seeing the pointer 22 at a position which bears no relation to the actual position of the aircraft with respect to the first omnirange station.

With the system operating to receive glide slope signals to move the horizontal pointer 24, the switch 100 of indicator 80 is in the GS position. Switch 100 is a four-deck switch having a single-pole double-throw switch on each deck. The glide slope signals are received by an antenna 11 connected to a receiver 12 and applied over lines 12-1 and 12-2 to contacts 220-1 and 220-2 of a relay 220 and the GS contacts of decks A and B of the switch 100 to the meter 25 which drives the horizontal pointer 24. The relay 220 is shown in the energized position, being placed in this condition by the flag warning signal on line 12-3. This flag signal is produced in the conventional manner and is applied to an amplifier 222 before energizing the relay 220. When relay 220 is energized, contact 220-3 applies an A.C. voltage through the GS contact of deck C of switch 100 to light lamp 124L. This illuminates the indicia under section 124 of the indicator 80 to show that the glide slope receiver is operative.

With switch 100 in the glide slope position and with no signals being received or with some other type of glide slope system or aircraft power supply malfunction, relay 220 is de-energized. This removes the A.C. voltage from lamp 124L and also removes the glide slope signals from the meter 25. At the same time, the voltage from a battery 225 is applied across the terminals of relay contacts 220-1 and 220-2 for application to the meter 25 to move the glide slope pointer 24 up into the opaque portion 225 of the face of the indicator 80. This positively shows the pilot that the glide slope system is not operating.

With switch 100 in the OMNI-2 position, signals from the second omnirange receiver 14, which are picked up by the antenna 13 are applied over lines 14-1 and 14-2, through relay contacts 230-2 and 230-3 to switch 101, which is a reversing switch. These signals are then applied through the OMNI-2 contact of decks A and B of switch 100 to the meter 25 to move pointer 24. In this mode of operation the pointer 24 is used to establish a course intercept between course radials from two omnirange stations. The second receiver 14 is tuned to the second station and the course set knob 36 (FIG. 1) is used to select the radia.

A Zener diode expansion circuit 232 is provided for expanding the scale of operation of the pointer 24 during the time when intercepts are being established. The double anode Zener diode conducts in response to signals from receiver 14 which are of an amplitude greater than those used to operate the pointer 24 over its normal scale. Thus, the pointer 24 will start to move in response to these larger signals and expand the scale of the pointer 24. However, the movement in the expanded region is compressed (non-linear) because of the diode conduction. When normal amplitude signals are received, the pointer 24 moves linearly.

The second omnirange receiver 14 also produces TO-FROM signals on line 14–3 and a flag warning signal on line 14–4. Only the FROM signal on line 14–4 is utilized and this signal is applied to one input of an AND circuit 236. The other input of the AND circuit is the flag warning signal on line 14–4. When signals are present at both inputs of the AND circuit an output signal is produced which is applied to amplifier 37 to energize relay 230. When this relay is energized (shown de-energized) an A.C. voltage is applied over contact 230–4 and the OMNI-2 contact of deck D of switch 100 to the lamp 122L to light the OMNI-2 indicia of the indicator in partially transparent section 122. Also, the FROM signal passes over contact 230–1 to move the pointer of meter 109 to the FROM position. This shows that the second omnirange receiver is operating in the FROM mode.

In FIGURE 2 relay 230 is shown in the de-energized condition, meaning that either the receiver 14 is off or it is not receiving signals. When this occurs, the A.C. voltage is removed from contact 230–4. Also, the voltage from a battery 239 is applied to the OMNI-2 positions of switch decks A and B of switch 100. Therefore, if switch 100 is in the OMNI-2 position, the glide slope pointer 24 is moved under the opaque portion 226 indicating to the pilot that the second omnirange receiver was not operating.

The reversing switch 101 reverses the leads 14–1 and 14–2, so that the pointer 24 will be driven in one direction or another. The pointer 24 is operated only when the second omnirange receiver 14 is in the FROM mode of operation and switch 101 is set to a left or right position corresponding to the position of the second omnirange station with respect to the aircraft. Therefore, the pointer 24 will always move in the same direction as the selected course radial from the second station is approached.

The omnirange receivers 10 and 14 and the glide slope receiver 12 are provided with press-to-test switches 250, 252 and 254 (shown on FIG. 1) in the flag warning signal line. When a respective switch is pressed, the respectively connected relay 202, 220 and 230 is de-energized and the pointer 22 or 24 is pulled under the opaque screen portion 216 or 226. This provides the pilot with a convenient way of checking the operation of the various systems.

FIGURE 2A shows an arrangement for placing the ADF pointers 105 and 107 at a predetermined position if either of the respective radio direction finder receivers 260 or 262 is inoperative or not receiving signals. Here, the output of receiver 260 for operating pointer 105 is applied to a relay amplifier 266 which controls a relay 268. When signals are received, relay 268 is energized and the radio direction finder receiver signals are applied to the meter 270 which moves the first ADF pointer 105 in the normal manner. If no signals are being received or if the the aircraft has a power failure, relay 268 opens and the voltage from a battery 272 is applied to meter 270. This voltage moves pointer 105 to the approximately 150° position on the compass card. As seen in FIGURE 1, two opaque portions 279 and 280 are provided on the face of indicator 90. The voltage from battery 272 moves pointer 105 under these opaque portions, thereby indicating to the pilot that receiver 260 is inoperative. A turn or bank of the aircraft will confirm this since the pointer 105 will not move.

A similar arrangement is provided for the second omnirange receiver 262 to position the second ADF pointer 107 under opaque portions 279 and 280. Here the components are relay amplifier 286, relay 284, battery 285 and meter movement 282. The receivers 260 and 262 are provided with the respective push-to-test switches 290 and 292 which open the relays 268 and 284 to give the pilot a check as to the operation of the system.

In some aircraft installations which use air driven instruments it is desirable to operate the fail-safe features of the system from the air on suction lines provided in the aircraft to drive these other instruments. An arrangement for doing this is shown in FIGURE 3, wherein the same components used in the embodiment of FIGURE 2 are designated by the same reference numerals. Here, the course deviation pointer 22 is operated in the same manner by the signals from receiver 10 applied over the relay contacts 202–2 and 202–3. Similarly, the TO-FROM meter 110 is operated by the signals on relay contact 202–1 and the lights 121L and 123L are operated by the A.C. voltage applied through relay contacts 202–4 and relay 208. Portions of the system are not repeated in the diagram for the sake of clarity.

In the embodiment of FIGURE 3, battery 215 is removed from across the relay contacts 202–2 and 202–3, so that there will be no voltage applied to meter 25 when relay 202 is de-energized. Instead, relay 202 is provided with two additional contacts 202–5 and 202–6 which are supplied with D.C. voltage from the aircraft power supply. These two relay contacts operate a solenoid 300 which in turn controls the movement of a piston 302 of a cylinder 303. The cylinder 303 is connected to a suction line 304, suction being maintained in the aircraft by a pump (not shown) or any other suitable piece of equipment. The solenoid 300 is provided with a spring 301 on its arm to urge piston 302 to a position to allow the suction line 304 to be open to a bellows 305 in the absence of any voltage on relay contacts 202–5 and 202–6. The bellows 305 has an air hole 306 to allow for the escaping pressure. The bellows is urged to an expanded condition by a spring 307, one end of which is connected to a fixed point and the other end to the bellows. An arm 309 having a hooked end 310 is also connected to a bellows. This arm is placed under the course deviation pointer 22 behind the opaque portion 226 of the indicator 80. The bellows 300 may be mounted either inside or outside of the indicator 80 housing.

When the first omnirange receiver 10 is operating properly, relay 202 is energized and actuates solenoid 300 via the D.C. voltage on contacts 202–5 and 202–6. The piston 302 is pulled to a position to close off the suction line 304 so that the bellows 305 is permitted to open, the opening aided by the urging of the spring 307. In this condition the course deviation pointer 22 is permitted to move freely.

If the omnirange receiver 10 is not operating, relay 202 is de-energized and the solenoid 300 is not actuated. The same condition holds for a failure of the aircraft power supply or of the power supply of the D.C. voltage applied to contacts 202–5 and 202–6. In either of these cases, the piston 302 is moved to a position so that the suction line 304 to the bellows 305 is open. This places the bellows in a closed condition which in turn pulls the arm 309 over so that the hook 310 catches the pointer 22 and moves it to a position under the opaque portion of the indicator 216. Thus, the pilot is provided with a positive indication that receiver 10 is not operating since the pointer 22 is out of view and will not move.

A similar arrangement is provided for the glide slope receiver 12 and the second omnirange receiver 14 to control the fail-safe operation of the glide slope pointer 24. Here, two extra decks E and F are added to switch 100 of FIGURE 2 and the upper (GS) contacts of these two decks are supplied with D.C. voltage from relay contacts 220–4 and 220–5. The lower (OMNI 2) contacts are supplied with D.C. voltage via relay contacts 230–5 and 230-6. In both relays the respective batteries 225 and 239 of FIG. 2 have been eliminated.

With switch 100 in the GS position and the glide slope receiver operating properly, relay 220 is energized and D.C. voltage is applied through the upper (GS) contacts of decks E and F of switch 100 to a solenoid 320. This solenoid controls a piston 322 in a cylinder 323 which is connected on the suction line 304. With solenoid 320 energized, the suction line 304 is closed so that the connected bellows 325 is in the open condition as urged outwardly by a spring 327. This bellows also carries an arm 329 with a hook 340 on the end thereof. With the bellows open the pointer 24 is free to move in the manner previously described under the control of the received glide slope signals.

When relay 220 is de-energized, such as by a power failure, receiver failure or other malfunction, the D.C. voltage is removed from relay contacts 220-4 and 220-5. The solenoid 320 then opens the suction line and the bellows 325 closes. This causes the arm 329 to move and the hook 324 to pull the pointer 24 up under the opaque portion 226 of the indicator. Here again, the pilot is made aware that his system is not operating properly since the pointer is restrained from moving by the arm 329.

A similar operation is effected by the D.C. voltage applied through relay contacts 230-5 and 230-6 of the relay 230 operated by the second omnirange receiver 14. Here, when switch 100 is in the lower contact (OMNI 2) position the D.C. voltage for the solenoid 320 is applied through switch decks E and F. If for some reason relay 230 is not energized, the solenoid 320 is de-energized so that the arm 329 pulls the pointer 24 out of view. When the system is operating properly in the OMNI-2 mode, solenoid 320 is energized and pointer 24 is permitted to move freely.

FIGURE 4 shows another type of indicator which can be used with either of the fail-safe embodiments shown in FIGURES 2 and 3. Here, the indicator is provided with optical means such as lucite blocks 421, 422, 423 and 424 which have various indicia engraved thereon. These blocks correspond to the transparent sections 121, 122, 123 and 124 of FIGURE 1. Each block has two lamp bulbs therein which are illuminated in the same manner and by the same relay contacts as the lamps 121L-124L described in FIGURE 2. Here, the respective blocks 421-424 when illuminated light up the engraved indicia. If desired, the blocks may be made of different color plastic to give different color indications.

The pointers 22 and 24 of the indicator 80 are replaced by two lucite rods 322 and 324, respectively, which have a roughened outer edge so that light will shine therethrough. These rods are driven by the meters 23 and 25, which are provided with the signals respectively from the first omnirange receiver and from the glide slope or the second omnirange receiver in the manner previously described. Two additional meters may be provided at the bottom and one side of the indicator to operate in parallel with the respective meters 23 and 25. The respective pointers 322 and 324 are suspended and moved between the two meters for each pointer.

Each pointer 322 and 324 is also provided with its own illuminating means mounted inside the pointer itself. A suitable lamp for accomplishing this, are the so-called Pinlites, manufactured by Kay Electric Company, of Pine Brook, New Jersey. These lights are small enough to be mounted on a meter pointer for movement thereon. The wires for the Pinlite on each pointer run behind the respective pointer, as shown in FIGURE 4A.

As the various receiver systems are operating, a respective block 421-424 is illuminated by the relay contacts of the power supply system in the manner previously described in FIGURE 2. Thus, a display is presented which gives the appearance that the light source for the pointer 22 is originating either ahead of or behind the aircraft as the receiver 10 operates in either the TO or FROM mode. In a similar manner the glide slope pointer appears to be illuminated either from the left or right of the indicator. This makes the GS and OMNI-2 modes very distinct to the pilot and the overall presentation gives the pilot a clear display of the operation of the various radio navigation systems.

The fail-safe arrangement of FIGURES 2 and 3 can be used with the indicator of FIGURE 4 in the manner previously described.

While the various fail-safe systems have been described as using electro-mechanical relays, it should be understood that solid state devices such as transistors, silicon controlled rectifiers and other similar devices may be used.

While certain presently preferred embodiments of the invention have been described, it is to be understood that the invention may be otherwise embodied and that the scope of protection is to be determined by the appended claims.

What is claimed is:

1. A flight instrument system for use on an aircraft comprising means for producing a first signal corresponding to the deviation in azimuth of the aircraft from a radio beam signal, means for producing second and third signals corresponding to the respective direction of flight of said aircraft to or from said radio beam signal, a display device including a first indicator means responsive to said first signal for producing an indication of said first signal thereby indicating the deviation in azimuth of the aircraft with respect to said radio beam signal, second and third indicator means each having respective indicia thereon corresponding to the to and from directions, means responsive to a respective second and third signal for illuminating the corresponding second and third indicator means, and means responsive to the absence of said first signal for preventing illumination of both said second and third indicator means.

2. A flight instrument system for use on an aircraft comprising means for producing a first signal corresponding to the deviation in azimuth of the aircraft from a radio beam signal, means for producing second and third signals corresponding to the respective direction of flight of said aircraft to or from said radio beam signal, a display device including a first pointer means, means responsive to said first signal during normal system operation for moving said first pointer means in response to said first signal to produce an indication of the positional deviation in azimuth of the aircraft with respect to said radio beam signal, second and third indicator means each having respective indicia thereon corresponding to the to and from directions, means responsive to a respective second and third signal for illuminating the corresponding second and third indicator means, and means responsive to the absence of said first signal for preventing movement of said first pointer means and for preventing illumination of both said second and third indicator means.

3. A display device according to claim 2 in which said means for preventing movement withdraws said first pointer means to a fixed position.

4. A system as set forth in claim 3 wherein the means for withdrawing the pointer means includes means for applying a fixed electrical bias signal to the pointer moving means.

5. A system as set forth in claim 3 wherein the means for withdrawing the pointer means includes a pressure operated movable arm which physically engages said pointer means.

6. A flight instrument system for use on an aircraft comprising means for producing a first signal corresponding to the deviation in azimuth of the aircraft from a radio beam signal, means for producing second and third signals corresponding to the respective direction of flight of said aircraft to or from said radio beam signal, a display device including a first pointer means, means responsive to said first signal during normal system operation for moving said first pointer means in response to said first signal to produce an indication of the positional deviation in azimuth of the aircraft with respect to said radio beam, second and third indicator means each having respective indicia thereon corresponding to the to and from directions, means responsive to a respective second and third signal for illuminating the corresponding second and third indicator means, a masked section on said display device, means responsive to the absence of said first signal for withdrawing said pointer means under said masked section, and means responsive to the absence of said first signal for preventing illumination of both said second and third indicator means.

7. A system as set forth in claim 6 wherein said pointer means is made of translucent material and a light source is provided thereon.

8. A flight instrument system for use on an aircraft comprising means for producing a first signal corresponding to the deviation in azimuth of the aircraft from a radio beam signal, means for producing second and third signals corresponding to the respective direction of flight of said aircraft to or from said radio beam signal, a display device including a first pointer means, means responsive to said first signal during normal system operation for moving said first pointer means in response to said first signal to produce an indication of the positional deviation in azimuth of the aircraft with respect to said radio beam, second and third indicator means each having respective indicia thereon corresponding to the to and from directions, means responsive to a respective second and third signal for illuminating the corresponding second and third indicator means, vacuum operated means having a movable arm operated thereby, the arm of said vacuum operated means being out of contact during normal operation of the system, means on the arm for engaging the first pointer means, means responsive to an abnormal operating condition of the system or aircraft for causing said vacuum operated means to move the engaging means of said arm into engagement with the pointer and withdraw it to a fixed position, and further means responsive to an abnormal operating condition for preventing illumination of both said second and third indicator means.

9. A display device for the flight instrument system of an aircraft which system produces a first signal corresponding to the deviation in azimuth of the aircraft from a radio beam signal and second and third signals corresponding to the respective direction of flight of said aircraft to or from said radio beam signal, said display device comprising a first indicator means responsive to said first signal for producing an indication corresponding to the deviation in azimuth of the aircraft with respect to said radio beam signal, second indicator means responsive to said second and third signals for producing an indication respectively corresponding to the direction of aircraft flight to or from the radio beam signal when said first signal is being produced, and means responsive to the absence of said first signal operating both said first and second indicator means to produce indications representing the absence of the first signal.

10. A display device as in claim 9 wherein said last-named means operates said first and second indicators to produce indications representative of the absence of the first signal which are different from the indications produced when the first signal is present.

References Cited by the Examiner
UNITED STATES PATENTS

| | | | |
|---|---|---|---|
| 2,393,624 | 1/1946 | Ferrill | 343—108 |
| 2,478,734 | 8/1949 | Abraham | 343—108 |
| 2,489,248 | 11/1949 | Abraham | 343—107 X |
| 2,778,004 | 1/1957 | Lear et al. | 340—27 |

FOREIGN PATENTS

| | | |
|---|---|---|
| 579,090 | 7/1946 | Great Britain. |

CHESTER L. JUSTUS, *Primary Examiner.*

H. C. WAMSLEY, *Assistant Examiner.*